(12) United States Patent
Frost

(10) Patent No.: US 9,395,829 B2
(45) Date of Patent: Jul. 19, 2016

(54) METHOD AND APPARATUS TO PRODUCE TIME-RELEASE PESTICIDE CONCENTRATION GRADIENT TO PROTECT PORTABLE ELECTRONIC DEVICE

(71) Applicant: Lynn E Frost, Gilbert, AZ (US)

(72) Inventor: Lynn E Frost, Gilbert, AZ (US)

(*) Notice: Subject to any disclaimer, the term of this patent is extended or adjusted under 35 U.S.C. 154(b) by 0 days.

(21) Appl. No.: 14/120,151

(22) Filed: Apr. 30, 2014

(65) Prior Publication Data

US 2016/0016394 A1 Jan. 21, 2016

Related U.S. Application Data

(60) Provisional application No. 61/956,700, filed on Jun. 13, 2013.

(51) Int. Cl.
| | |
|---|---|
| B32B 37/10 | (2006.01) |
| G06F 3/041 | (2006.01) |
| A01M 99/00 | (2006.01) |
| B32B 7/12 | (2006.01) |
| B32B 27/40 | (2006.01) |
| B32B 27/08 | (2006.01) |

(52) U.S. Cl.
CPC ............... *G06F 3/041* (2013.01); *A01M 99/00* (2013.01); *B32B 7/12* (2013.01); *B32B 27/08* (2013.01); *B32B 27/40* (2013.01); *B32B 2255/10* (2013.01); *B32B 2307/412* (2013.01); *B32B 2307/764* (2013.01); *B32B 2457/00* (2013.01); *G06F 2203/04103* (2013.01)

(58) Field of Classification Search
CPC .......... G06F 3/041; G06F 2203/04103; B32B 2457/00; B32B 2307/412; B32B 5/00; B32B 7/12; B32B 2307/764; B32B 2457/208; B32B 2307/40; B32B 2307/41; B32B 2307/414; B32B 2307/416; B32B 2307/418; B32B 2307/406; A01M 99/00
See application file for complete search history.

(56) References Cited

U.S. PATENT DOCUMENTS

2009/0301907 A1* 12/2009 Mason .................. C11D 17/049
206/223
2012/0210630 A1* 8/2012 Ashley .................. A01K 11/001
43/132.1

\* cited by examiner

*Primary Examiner* — Jacob T Minskey
*Assistant Examiner* — Vishal I Patel
(74) *Attorney, Agent, or Firm* — Tod R. Nissle, P.C.

(57) ABSTRACT

A process produces a time release pesticide gradient to protect a cellular telephone. The process includes the step of providing a pliable laminate film shaped to cover a selected portion of the face of a cellular telephone. The film comprises outer sealing layers bounding a transparent inner laminate sandwich. The inner laminate sandwich comprising polymers layer bounding a time-pressure release pesticide used to produce a pesticide concentration gradient in the polymer layers bounding the pesticide.

1 Claim, 5 Drawing Sheets

METHOD AND APPARATUS TO PRODUCE TIME-RELEASE PESTICIDE CONCENTRATION GRADIENT TO PROTECT PORTABLE ELECTRONIC DEVICE

This application claims priority based on provisional patent application Ser. No. 61/956,700, filed Jun. 13, 2013.

This invention relates to wireless, portable electronic devices comprising a housing, a microprocessor, a touch screen, a touch screen generated keyboard, wi-fi capability, audio-visual display capability (i.e., to show a movie), the ability to load and utilize "apps" (such as iTune or other apps), network connectivity, apparatus which permits the location of the devices to be determined using a global positioning system, and connector openings or socket to receive one or more connector pins at the end of an audio cable, a display screen cable, a television cable, or other data transmission cable.

More particularly, the invention relates to a method and apparatus to marginalize damage to such portable electronic devices by mites, lice, ticks, maggots, small arachnids, roaches, poisonous centipedes, and other insects which can inhabits such devices and are attracted to such devices by human skin cells, bodily fluids, and bacteria which are deposited on or reside in such devices.

Pests and other damaging influences can stain, produce odors, or otherwise damage the structure of cell telephones. Since touch screen devices of the type described typically are subjected to continuous handling, materials and compositions and pests transferred from the hands of an individual to the devices can facilitate such conditions. Those of skill in the art have long investigated methodologies and structures which can minimize damage to a touch screen electronic device. Accordingly, it would be highly desirable to provide an improved method and apparatus to minimize damage to a touch screen electronic device.

Therefore, it is a principal object of the invention to provide an improved method and apparatus to protect a touch screen electronic device.

This, and other and further objects of the invention will be apparent to those skilled in the art from the following detailed description thereof, taken in conjunction with the drawings, in which.

Briefly, in accordance with the invention, provided is a method to protect an apparatus from insect pests. The method comprises the step of providing a wireless, portable electronic device. The device comprises a housing; a microprocessor; a face including a touch screen; a touch screen generated keyboard; apparatus providing a wi-fi capability; audio-visual display capability; apparatus providing the ability to load and utilize "apps"; apparatus providing network connectivity; apparatus which permits the location of the device to be determined using a global positioning system, and at least one connector socket to receive at least connector pin of a data transmission cable one or more connector pins at the end of an audio cable. The method also comprises the step of providing a pliable laminate film shaped to cover a selected portion of the face of the electronic device, including the display screen. The film comprises outer sealing layers bounding an inner transparent laminate sandwich. The inner laminate sandwich comprises inner polymer layers; a time-pressure release pesticide; and, an adhesive layer contacting one of the inner polymer layers. The adhesive layer is activated with an application fluid. The method also includes the steps of providing a squeegee with an elongate pressure-applying edge; providing the activation fluid; cleaning the face of the electronic device; removing the outer sealing layers from the laminate film; wetting the adhesive layer with the activation fluid; applying the laminate sandwich to the face of the electronic device contacting the face with the wetted adhesive layer; slidably adjusting the laminate sandwich over the face of the electronic device to a selected position in registration with the selected portion of the face; sliding the elongate edge of the squeegee over the laminate sandwich to remove excess activation fluid and to generate compressive pressure against the laminate sandwich to release the time-pressure release pesticide to produce a pesticide concentration gradient in inner polymer layers in the laminate sandwich; and, drying the electronic device.

Figures 1, 2:
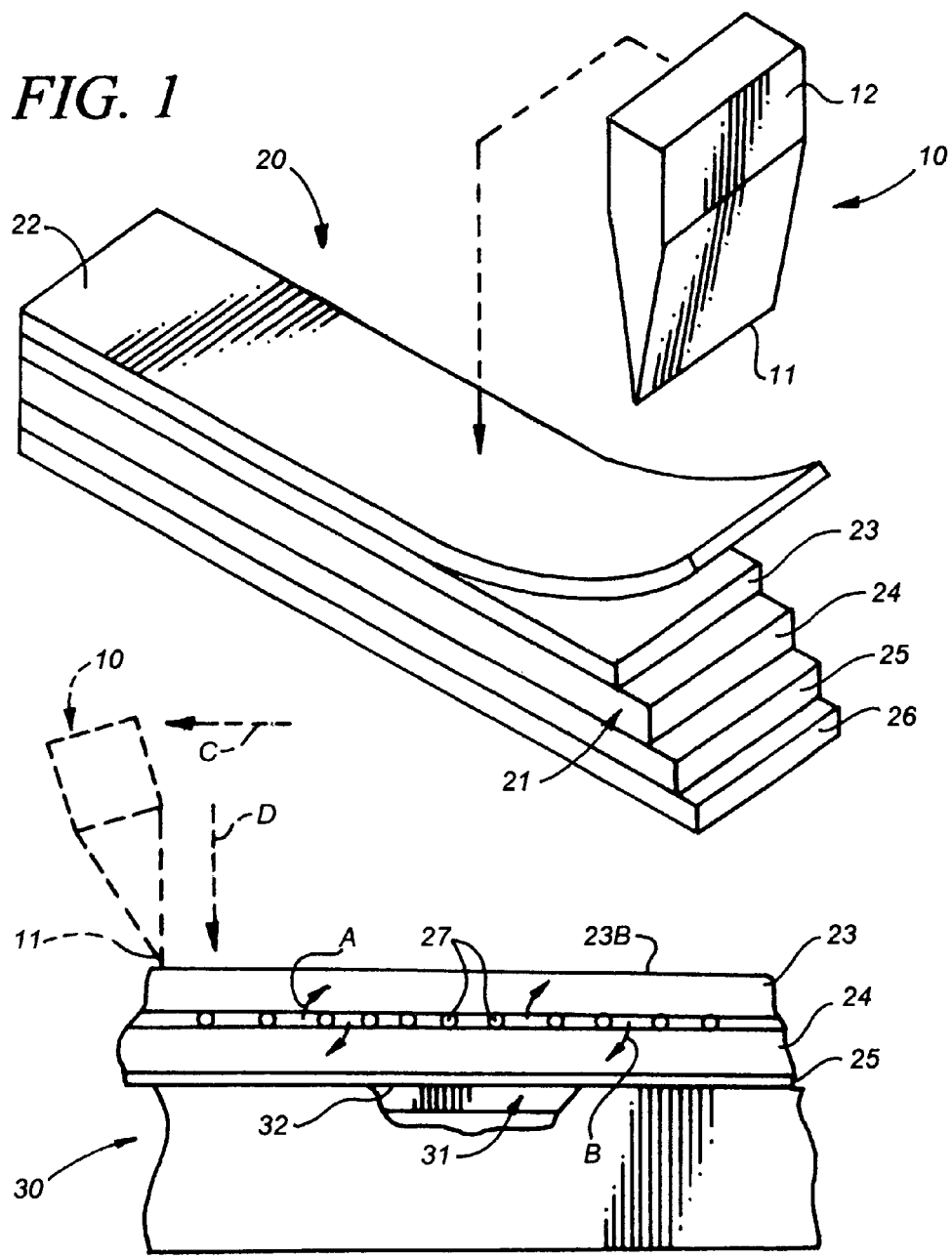
FIG. 1 is a perspective viewing illustrating a laminate film and squeegee used in an embodiment of the invention, the laminate film including an inner laminate sandwich.
FIG. 2 is a side view illustrating the inner laminate sandwich of the laminate film of FIG. 1 applied to the face of a cellular telephone.

Turning now to the drawings, which depict embodiments of the invention for the purpose of illustration thereof, and not by way of limitation of the invention, and in which like characters refer to corresponding elements throughout the various views, FIG. 1 illustrates a pliable laminate film 20 constructed in accordance with the invention, and also illustrates a squeegee 10 utilized in applying a portion of film 20 to the outer surface of the display screen of one kind of electronic device utilized in the practice of the invention, namely a cellular telephone.

A cellular telephone, as do other wireless, portable electronic devices used in the practice of the invention, comprises a housing, a microprocessor, a touch screen, a touch screen generated keyboard, wi-fi capability, audio-visual display capability (i.e., to show a movie), the ability to load and utilize "apps" (such as iTune or other apps), apparatus enabling connectivity with the Internet or other networks, apparatus which permits the location of the devices to be determined using a global positioning system, and connector openings or socket to receive one or more connector pins at the end of an audio cable, a display screen cable, a television cable, or other data transmission cable. As used herein, a portable electronic device is a device having a length and a width of twenty four inches or less that is readily carried by a single individual. By way of example, an iPhone can have a length of about four and one-half inches and a width of about two and one-quarter inches.

A significant problem with such portable devices is that constant handling of the devices and use of the touch screen leaves deposits of human skins, perspiration, and other material which can attract insects. Such insects can enter the devices through connector sockets and other openings in the devices and produce odors, stains, and other undesirable effects. The insects can also facilitate the production of bacteria colonies on the devices.

Returning to FIG. 1, squeegee 10 includes a handle 12 used to grasp squeegee 10 and manipulate squeegee 10 such that elongate edge 11 contacts and moves over a laminate sandwich in the manner illustrated in FIG. 2 and described in more detail below.

Laminate film 20 includes outer sealing layers 22 and 26 bounding an inner laminate sandwich 21. The inner pliable transparent laminate sandwich 21 comprises inner polymer layers 23 and 24, a time-pressure release pesticide 27 (FIG. 2), and an adhesive layer 25 contacting one of the inner polymer layers 25. If desired, laminate sandwich 21 need not be transparent, but in a preferred embodiment of the invention sandwich 21 is necessarily transparent because it is applied over a display screen of a cellular telephone or other device. Adhesive layer 25 is, after the sealing layer 26 is removed, activated with an application fluid. The application fluid can have any desired composition depending on the composition of the adhesive layer. A variety of adhesives for polymers are well known in the art and will not be set forth herein. Similarly, a variety of fluids for activating adhesives are well known and are not categorized herein. In one presently preferred embodiment of the invention, the activation fluid includes ammonia, which functions to activate the adhesive by causing it to set up and harden. Other adhesives may be activated by water causing the adhesive to become sticky and better adhere to the screen of a cellular telephone or other device. A liquid substance for activating the adhesive is considered important in the practice of the invention because, as will be seen, the liquid reduces friction when a film is being applied to the display screen of a cellular telephone. Such a reduction in friction is desirable because it permits the film to slide around on the screen so the film can be manually manipulated and positioned at a desirable location on the face of a cellular telephone before the adhesive sticks to the face and prevents the position of the film from being adjusted.

The outer pliable layers 22 and 26 are important because the pesticide 27 intermediate layers 23 and 24 degrades and weakens over time. Layers 22 and 26 function to sealingly protect pesticide 27 and to slow degradation of the same. Layers 22 and 26 can be fabricated from any desirable material but preferably comprise a pliable polymer which slows the penetration of oxygen, light, water vapor, or any other desired composition into layers 23 and 24, respectively, and into pesticide 27. Layer 22 readily peels off layer 23; layer 26 readily peels off adhesive layer 25. Pliable film layers 23 and 24 can similarly be fabricated from any desired material, but currently are preferably comprised of a transparent polymer material, namely composition which includes urethane. The total combined thickness of layers 23 and 24 is preferably in the range of 4 to 7 mils. Layers 23 and 24 further are comprised of materials that permit a pesticide utilized in the invention to permeate the material. Polymers which permit a pesticide to permeate, impregnate, and infuse into the polymer are well known in the art and are not recited herein. Similarly, pesticides which can permeate, impregnate, and infuse into a polymer are well known and are not recited herein.

Pesticide 27 comprises a plurality of small bubbles. Each bubble contains a quantity of a liquid pesticide composition. As described below, when, during installation of film on a cellular telephone, squeegee 10 is grasped and manipulated so that elongate edge 11 contacts and is slid over film layer 23 in the direction of arrow C to produce a downward compressive force acting in the direction of arrow D in FIG. 2, the compressive force breaks the bubbles and releases the liquid pesticide composition housing in the bubbles. Upon release, the pesticide composition permeates and impregnates layers 23 and 24 in the manner indicated by arrows A and B in FIG. 2. Further, upon release from bubbles, the liquid pesticide composition produces a concentration gradient in layers 23 and 24 such that the concentration of pesticide composition in layer 23 (or 24) is greater near the source of the pesticide composition than it is at the outer surface 23B of layer 23. This is important because the lower concentration of pesticide at the outer surface 23B reduces the concentration of pesticide composition which may contact the skin of a user when the user contacts layer 23 with a hand or finger. Similarly, the concentration of pesticide composition initially produced in layer 24 is less near layer 23 than it is at the surface of layer 24 contacting adhesive layer 25.

In one embodiment of the invention, the bubbles referred to above contain a solid, or semi-liquid, composition instead of a liquid composition.

Figure 3:
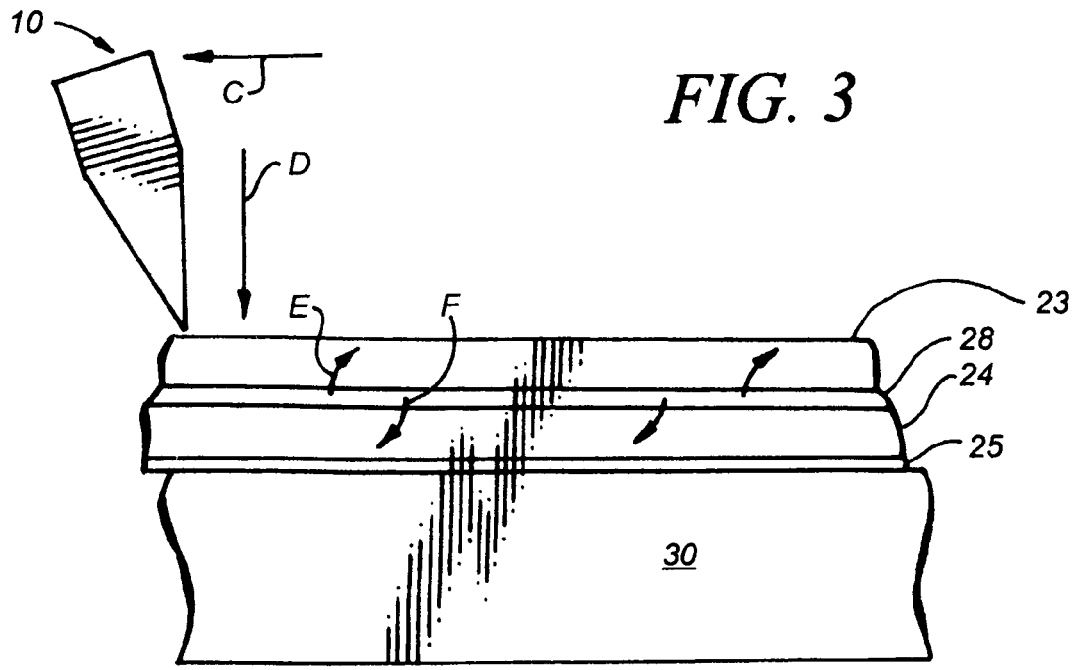
FIG. 3 is a side view illustrating an alternate inner laminate sandwich applied to the face of a cellular telephone.

An alternate embodiment of the invention is illustrated in FIG. 3 wherein a layer of material 28 is impregnated with pesticide composition, preferably, but not necessarily, a liquid pesticide composition. When film is being applied with a squeegee 10 to the display screen of a cellular phone in the manner described below, the compressive force D which is generated by the squeegee functions to squeeze a liquid pesticide composition out of the layer 28 so that the pesticide composition can more readily infuse layers 23 and 24 in the manner indicated by arrows E and F in FIG. 3.

Figure 4:
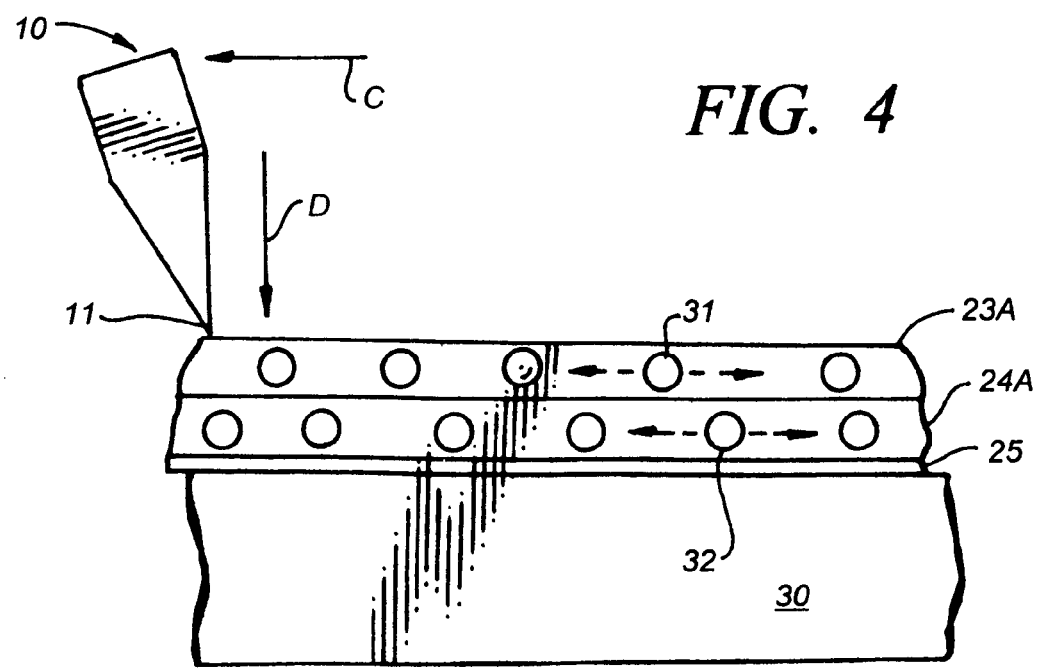
FIG. 4 is a side view illustrating another alternate inner laminate sandwich applied to the face of a cellular telephone.

In the embodiment of the invention illustrated in FIG. 4, the pesticide 31 comprises bubbles which contain a pesticide composition. The bubbles are, however, contained in at least one layer 23A, 24A. When film is being applied with a squeegee 10 to the display screen of a cellular phone in the manner described below, the compressive force D which is generated by the squeegee functions to burst the bubbles such that the pesticide composition can more readily infuse layers 23A and 24A.

Figure 5:
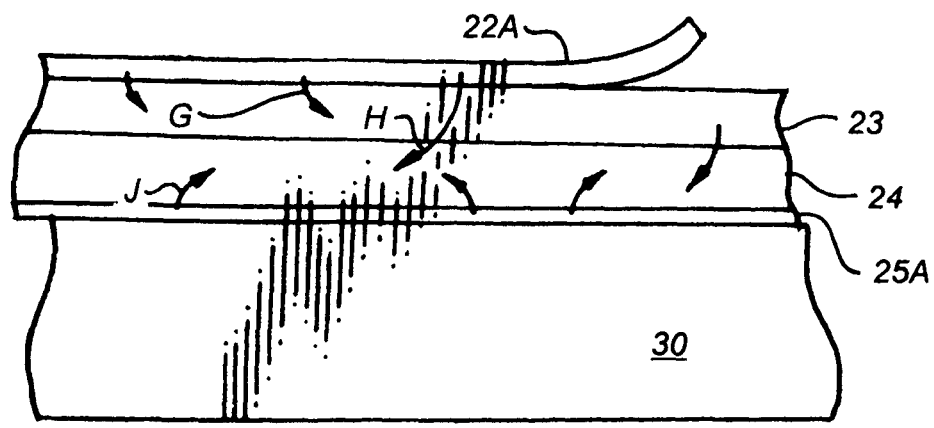
FIG. 5 is a side view illustrating still another alternate inner laminate sandwich applied to the face of a cellular telephone.

In FIG. 5, layer 22A contains a pesticide composition which migrates into and infuses layers 23 and 24 in the manner indicated by arrows G and H. Adhesive layers 25A (or a sealing layer 26) can also contain a pesticide composition which migrates into and infuses layers 23 and 24 in the manner indicated by arrow J.

Figure 6:
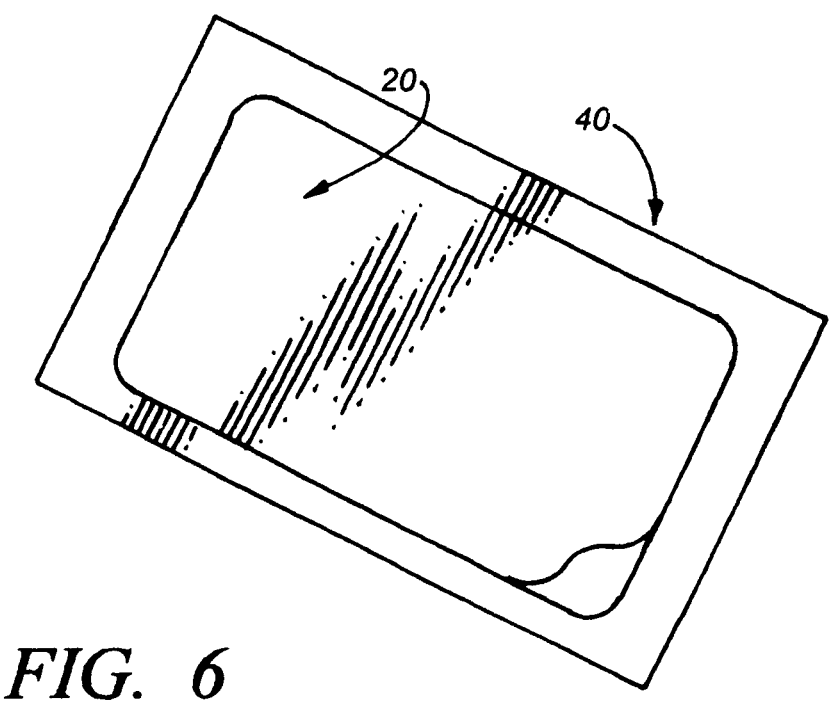
FIG. 6 is a perspective view illustrating a laminate film constructed in accordance with the invention.

In FIG. 6, laminate film 20 is die cut from a sheet 40 of film. In an alternate embodiment of the invention, when laminate film 20 is die cut from a sheet 40, only layers 22 to 25 are cut through. Layer 26 is not cut through.

Figure 7:
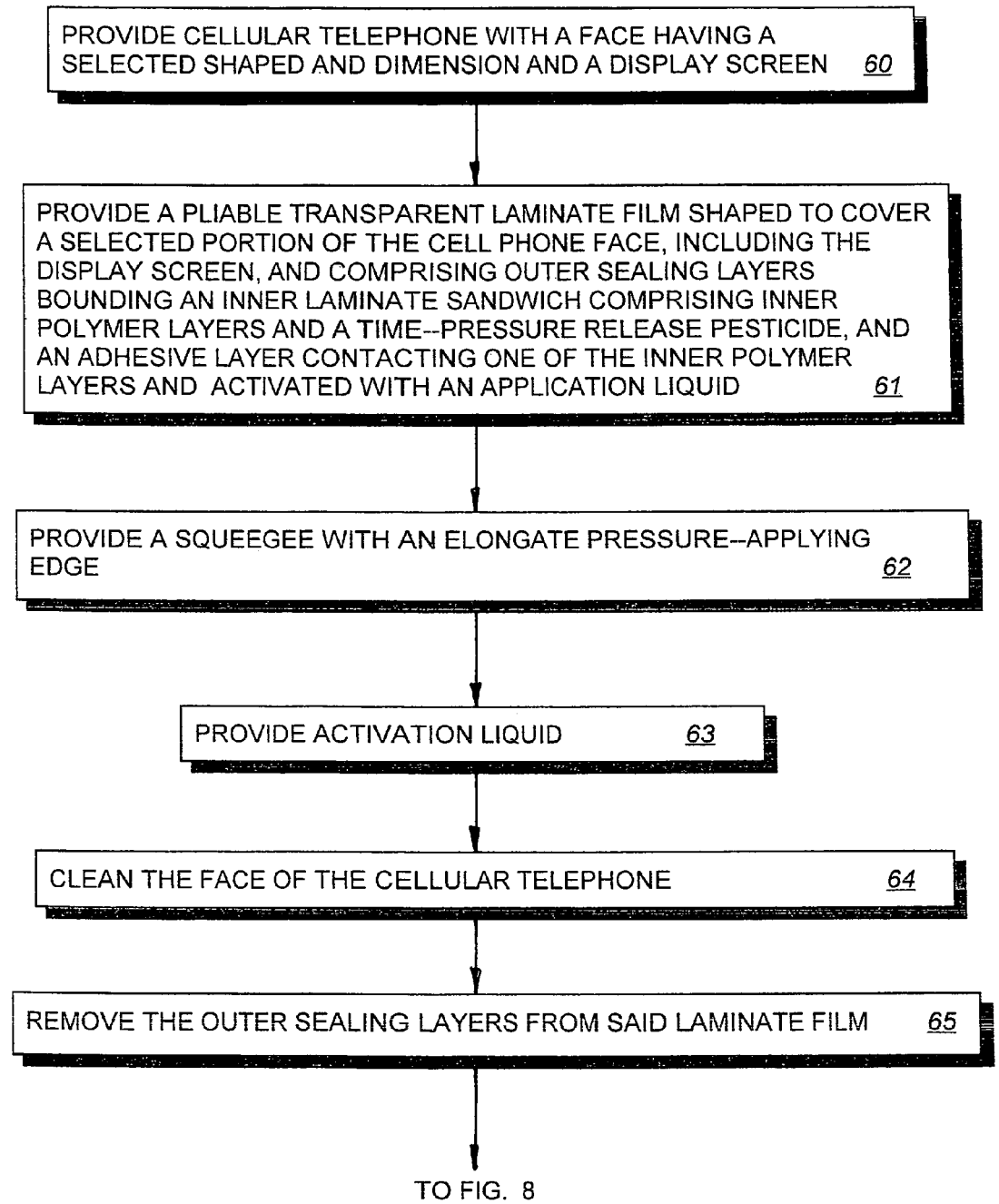
FIG. 7 is a block flow diagram illustrating a method of producing a time release pesticide gradient in accordance with an embodiment of the invention; and, FIG. 8 is a block flow diagram further illustrating the method of FIG. 7.
Figure 8:
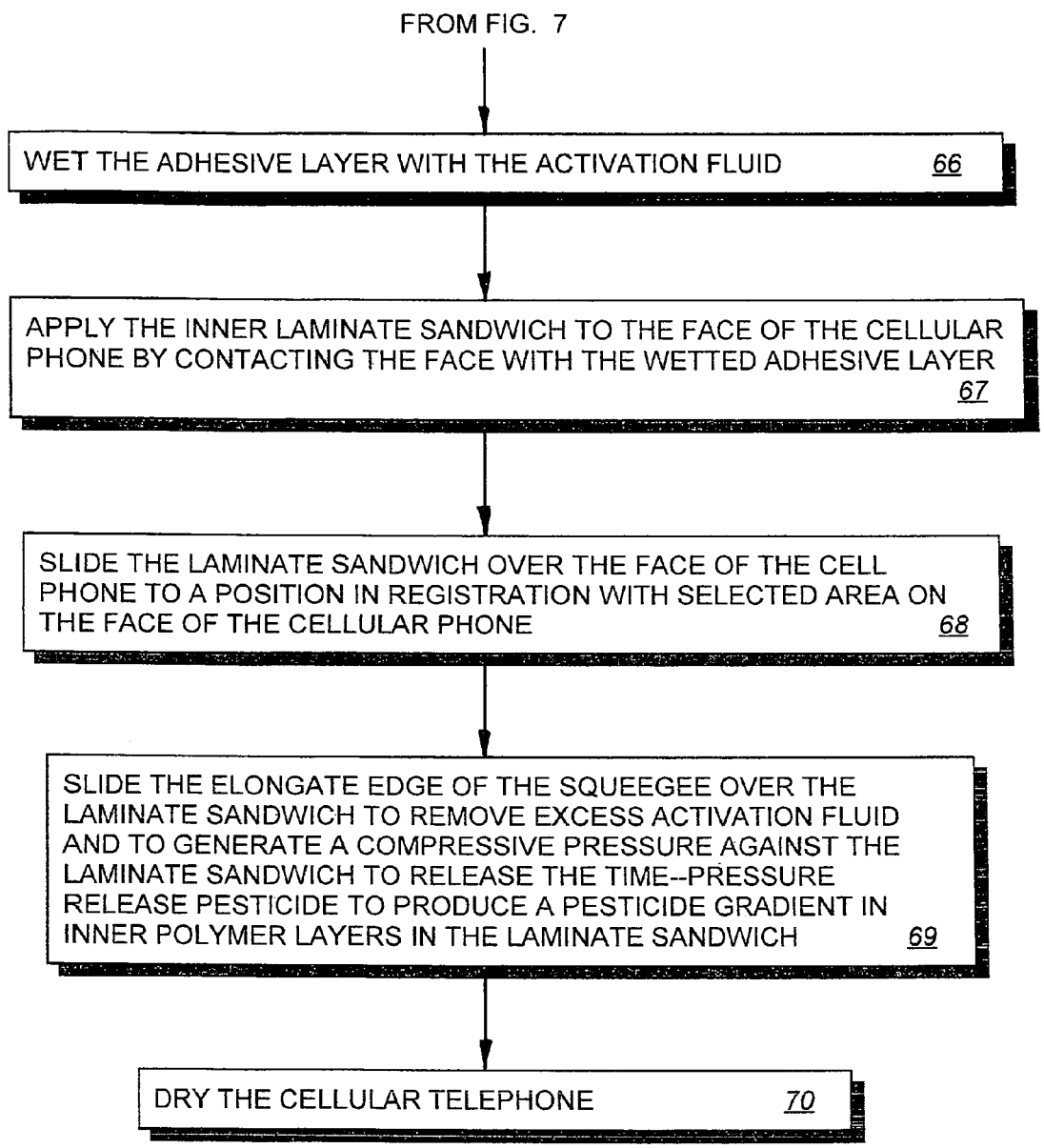

A method of installing laminate film 20 is set forth in the block flow diagram spanning FIGS. 7 and 8.

In step 60, a cellular telephone 30 is provided which has a face including a display screen 31 with an outer surface 32 (FIG. 2). The face has a selected shape and dimension, as does the display screen. Film 20 can be used to cover any desired area of the exterior surface of the face of the cell phone, or can, for that matter, be used to cover any exterior surface of the cell phone or other portable electronic device or any other desired device or article. The method and apparatus of the invention has, however, been found particularly useful in protecting cellular telephones because they are handled extensively, are often dropped and exposed to moisture, and are susceptible to being damaged by various pests.

In step 61 a pliable, transparent laminate film 20 shaped to cover a selected portion of the cell phone face, including the display screen, is provided. The film 20 comprises outer sealing layers 22 and 26 which reduce the ability of oxygen or light or other compositions to penetrate layers 23 and 25, respectively, to attack and degrade a pesticide composition which is housed in bubbles that are intermediate layers 23 and 24. Layers 22 and 26 bound an inner laminate sandwich 21 comprising inner pliable transparent polymer layers 23 and 24 and comprising a time-pressure release pesticide. Sandwich 21 also includes an adhesive layer 25 contacting and adhering to layer 24. The adhesive layer 25 is activated by contacting layer 25 with an application liquid. Pesticide 27 comprises small bubbles each containing a pesticide composition. Pesticide 27 is termed a time release pesticide because the pesticide composition in the bubbles is not released for a period of time, namely, is not released until sealing layers 22 and 26 are removed, until the inner laminate sandwich 21 is placed on the display screen of a cellular phone, and until a squeegee or other tool is used to apply a compressive pressure to burst the bubbles and release the pesticide composition from the bubbles. Pesticide 27 is termed a pressure release composition because the pesticide composition is not released from the bubbles until compressive pressure is applied to the bubbles.

In step 62, a squeegee 10 is provided. The squeegee 10 is provided with an elongate edge 11.

In step 63, an activation fluid is provided. The fluid is used to wet and activate adhesive layer 25.

In step 64, the face of the cellular telephone is cleaned prior to placing the inner laminate sandwich on the face of the cellular telephone over the display screen.

In step 65, outer sealing layers 22 and 26 are peeled off and removed from laminate film 20.

In step 66, adhesive layer 25 is wetted with the activation fluid.

In step 67, the inner laminate sandwich 21 is applied to the face of the cellular phone by contacting the face with the wetted adhesive layer.

In step 68, the inner laminate sandwich 21 is slidably positioned on the face of the cell phone to be in registration with and cover a selected area on the face of the cellular telephone.

In step 69, the elongate edge 11 of squeegee 10 is, to remove excess activation liquid, slid over layer 23 of the laminate sandwich 21 in the direction indicated by arrow C in FIG. 2, although the direction of travel of squeegee 10 over, layer 23 can vary as desired. Squeegee 10 is also used to apply a compressive pressure in the direction indicated by arrow D. The pressure is sufficient to burst bubbles that are between layers 23 and 24 and contain a pesticide composition. When the bubbles burst, the pesticide composition is released and, at least initially, infuses layers 23 and 24 to produce in each layer a concentration gradient of the pesticide composition such that the concentration of the pesticide composition is greater near the boundary between layers 23 and 24 than it is at the outer face or surface 23B of each layer 23, 24. In FIG. 2, the outer face of layer 24 contacts adhesive layer 25.

In step 70, the cellular phone is dried to remove the remainder of the application liquid that was used to wet adhesive layer 25. Squeegee 10 removes most of such application liquid, but some small amount of application liquid typically remains on the cell phone. Drying the phone removes such liquid. One procedure used to dry the phone comprises passing a stream of ambient air over the phone, although the air stream can, if desired, be heated (or cooled).

The strength of the insecticide in the pliable laminate film degrades over time to levels which have minimal effectiveness against insects. In one embodiment of the invention, it is critical to remove and replace the laminate film with a new laminate film having the desired concentration of insecticide.

The concentration of insecticide in the laminate film can vary as desired, but preferably is sufficient when at least one selected kind of insect (i.e., fleas, flies, spiders having a size less than a selected size, etc.) directly contacts the film to weaken the insect or cause the insect to die within twenty four hours following the direct contact. While the period time after which laminate film on an electronic device should be replaced can vary as desired, it currently preferably is important to replace laminate film every two to twelve months, preferably every two to ten months, more preferably every two to eight months, and most preferably every three to six months.

Having described my invention in such terms as to enable those skilled in the art to make and use the invention, I claim:

1. A method to protect an apparatus from insect pests, said method comprising the steps of
    (a) providing a wireless, portable electronic device comprising
        (i) a housing;
        (ii) a microprocessor;
        (iii) a face including a touch screen;
        (iv) a touch screen generated keyboard;
        (v) apparatus providing a wi-fi capability;
        (vii) apparatus providing the ability to load and utilize apps;
        (viii) network connectivity;
        (ix) apparatus which permits the location of the device to be determined using a global positioning system, and
        (x) at least one connector socket to receive at least connector pin of a data transmission cable one or more connector pins at the end of an audio cable;
    (b) providing a pliable laminate film shaped to cover a selected portion of said face of said electronic device, including the display screen, said film comprising outer sealing layers bounding a transparent inner laminate sandwich, said inner laminate sandwich comprising
        (ii) a time-pressure release pesticide, and
        (iii) an adhesive layer contacting one of said inner polymer layers, said adhesive layer activated with an application fluid;
    (c) providing a squeegee with an elongate pressure-applying edge;
    (d) providing said activation fluid;
    (e) cleaning the face of said electronic device;
    (f) removing the outer sealing layer from said laminate film;
    (g) wetting said adhesive layer with the activation fluid;
    (h) applying the laminate sandwich to the face of said electronic device by contacting the face with the wetted adhesive layer;
    (i) slidably adjusting the laminate sandwich over the face of said electronic device to a selected position in registration with said selected portion of the face;
    (j) sliding the elongate edge of the squeegee over the laminate sandwich to remove excess activation fluid and to generate compressive pressure against the laminate sandwich to release the time-pressure release pesticide to produce a pesticide concentration gradient in inner polymer layers in the laminate sandwich; and,
    (k) drying said electronic device.

* * * * *